United States Patent
Son et al.

(10) Patent No.: US 10,783,302 B2
(45) Date of Patent: Sep. 22, 2020

(54) CIRCUIT MODULE FOR MODELLING A DIGITAL CIRCUIT AND SIMULATION DEVICE INCLUDING THE CIRCUIT MODULE

(71) Applicants: SK hynix Inc., Icheon (KR); Seoul National University R&DB Foundation, Seoul (KR)

(72) Inventors: Seuk Son, Seoul (KR); Seungheon Baek, Gwangmyeong (KR); Youngjun Kim, Seoul (KR); Jaeha Kim, Seoul (KR)

(73) Assignees: SK hynix Inc., Icheon (KR); Seoul National University R&DB Foundation, Seoul (KR)

( * ) Notice: Subject to any disclaimer, the term of this patent is extended or adjusted under 35 U.S.C. 154(b) by 0 days.

(21) Appl. No.: 16/450,587

(22) Filed: Jun. 24, 2019

(65) Prior Publication Data

US 2020/0012757 A1    Jan. 9, 2020

(30) Foreign Application Priority Data

Jul. 9, 2018    (KR) .......................... 10-2018-0079299

(51) Int. Cl.

| G06F 9/455 | (2018.01) |
| G06F 17/50 | (2006.01) |
| G06F 30/3312 | (2020.01) |
| G06F 30/367 | (2020.01) |
| G06F 119/12 | (2020.01) |

(52) U.S. Cl.
CPC ........ *G06F 30/3312* (2020.01); *G06F 30/367* (2020.01); *G06F 2119/12* (2020.01)

(58) Field of Classification Search
USPC ................................. 716/101, 102, 106, 108
See application file for complete search history.

(56) References Cited

U.S. PATENT DOCUMENTS

| 6,823,086 B1 * | 11/2004 | Dolazza ................. G06T 5/002 348/610 |
| 8,726,211 B2 | 5/2014 | Phillips et al. |
| 2007/0214377 A1 * | 9/2007 | Jarrar ....................... G06F 1/10 713/401 |
| 2010/0259236 A1 * | 10/2010 | Wickersham ......... H02M 3/156 323/282 |
| 2012/0025800 A1 * | 2/2012 | Dettloff ............... H04L 25/0278 323/299 |
| 2013/0304782 A1 * | 11/2013 | Gallegos-Lopez ...... G06K 9/48 708/290 |
| 2014/0035650 A1 * | 2/2014 | Zerbe .................. H03K 3/0315 327/299 |

(Continued)

FOREIGN PATENT DOCUMENTS

KR    2014005151 A    4/2014

*Primary Examiner* — Brian Ngo (57) ABSTRACT

A circuit module includes a model circuit and a look-up table (LUT). The model circuit generates an output signal based on one or more input signals, and corresponds to a digital circuit. The LUT stores one or more control signals and one or more operation parameters that are to be used to implement the model circuit. The one or more control signals and the one or more operation parameters correspond to an index determined by a combination of the one or more input signals and the output signal.

18 Claims, 13 Drawing Sheets

(56) References Cited

U.S. PATENT DOCUMENTS

| | | | |
|---|---|---|---|
| 2014/0063069 A1* | 3/2014 | Prabakaran | G06T 1/60 |
| | | | 345/660 |
| 2017/0003966 A1* | 1/2017 | Haraden | G06F 9/32 |
| 2017/0139948 A1* | 5/2017 | Kaul | G06F 17/10 |
| 2018/0300281 A1* | 10/2018 | Saastamoinen | G06F 13/4068 |
| 2019/0356287 A1* | 11/2019 | Lesso | H04R 29/001 |

* cited by examiner

| a1 | a2 | y1 | state |
|----|----|----|-------|
| 0  | 0  | 1  | 1     |
| 0  | 1  | 1  | 2     |
| 1  | 0  | 1  | 3     |
| 1  | 1  | 0  | 4     |

| Current state | Next state | index |
|---|---|---|
| 1 | 4 | 1 |
| 2 | 4 | 2 |
| 3 | 4 | 3 |
| 4 | 1 | 4 |
| 4 | 2 | 5 |
| 4 | 3 | 6 |

| index | D1 | D2 | SW1 | SW2 | GMP1 | THP1 | ... | C |
|-------|----|----|-----|-----|------|------|-----|---|
| 1 | | | | | | | ... | |
| 2 | | | | | | | ... | |
| 3 | | | | | | | ... | |
| 4 | | | | | | | ... | |
| 5 | | | | | | | ... | |
| 6 | | | | | | | ... | |

| index | SEL1 | SEL2 | SW1 | SW2 | GMP1 | THP1 | ... | C |
|---|---|---|---|---|---|---|---|---|
| 1 | | | | | | | ... | |
| 2 | | | | | | | ... | |
| 3 | | | | | | | ... | |
| 4 | | | | | | | ... | |
| 5 | | | | | | | ... | |
| 6 | | | | | | | ... | |

CIRCUIT MODULE FOR MODELLING A DIGITAL CIRCUIT AND SIMULATION DEVICE INCLUDING THE CIRCUIT MODULE

CROSS-REFERENCE TO RELATED APPLICATIONS

The present application claims priority under 35 U.S.C. § 119(a) to a Korean Patent Application No. 10-2018-0079299, filed on Jul. 9, 2018, which are incorporated herein by reference in its entirety.

BACKGROUND

1. Technical Field

Various embodiments generally relate to a circuit module for modeling a digital circuit and a simulation device including the circuit module.

2. Related Art

Various techniques for modelling an operation of a digital circuit in accordance with a transition of an input signal have been developed.

Commercial chips include a large number of digital circuits. Spice simulation, which is commonly used, takes a very long time for simulation. Therefore, it is very difficult to verify chip operations when a simulation speed is slow. Accordingly, there is a demand for a technique of efficiently reducing a simulation time for a digital circuit.

SUMMARY

In accordance with the present teachings, a circuit module includes a model circuit configured to generate an output signal based on one or more input signals and correspond to a digital circuit, and a look-up table (LUT) storing one or more control signals and one or more operation parameters that are to be used to implement the model circuit, the one or more control signals and the one or more operation parameters corresponding to an index determined by a combination of the one or more input signals and the output signal.

In accordance with the present teachings, a simulation devices includes a model circuit configured to generate an output signal based on one or more input signals and correspond to a digital circuit, a look-up table (LUT) storing one or more control signals and one or more operation parameters that are to be used to implement the model circuit, the one or more control signals and the one or more operation parameters corresponding to an index determined by a combination of the one or more input signals and the output signal, and a control circuit configured to simulate the digital circuit by controlling the model circuit and the LUT.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed novelty, and explain various principles and advantages of those embodiments.

DETAILED DESCRIPTION

The following detailed description references the accompanying figures in describing illustrative embodiments consistent with this disclosure. The embodiments are provided for illustrative purposes and are not exhaustive. Additional embodiments not explicitly illustrated or described are possible. Further, modifications can be made to presented embodiments within the scope of the present teachings. The detailed description is not meant to limit this disclosure. Rather, the scope of the present disclosure is defined in accordance with the presented claims and equivalents thereof.

Figure 1:
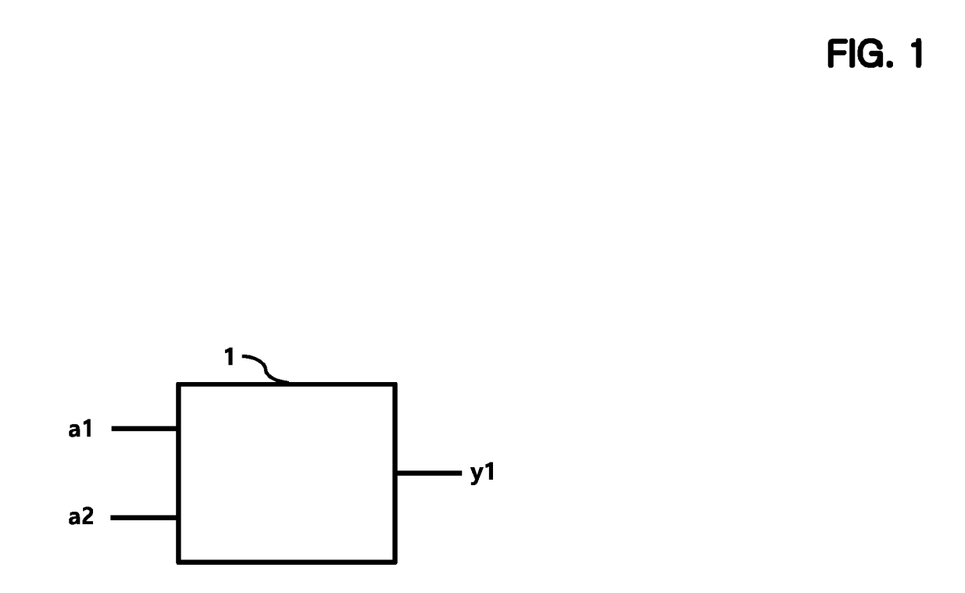
FIG. 1 shows a block diagram illustrating a digital circuit.

FIG. 1 shows a block diagram illustrating a digital circuit 1.

Referring to FIG. 1, the digital circuit 1 may generate an output signal y1 based on two input signals a1 and a2.

The digital circuit 1 may include a digital gate circuit such as a NAND gate, a NOR gate, or the like.

The digital circuit 1 may include a plurality of logic gates that are combined to generate one output signal y1 based on the two input signals a1 and a2.

Hereinafter, it is assumed that the digital circuit 1 is a NAND gate.

Figure 2:
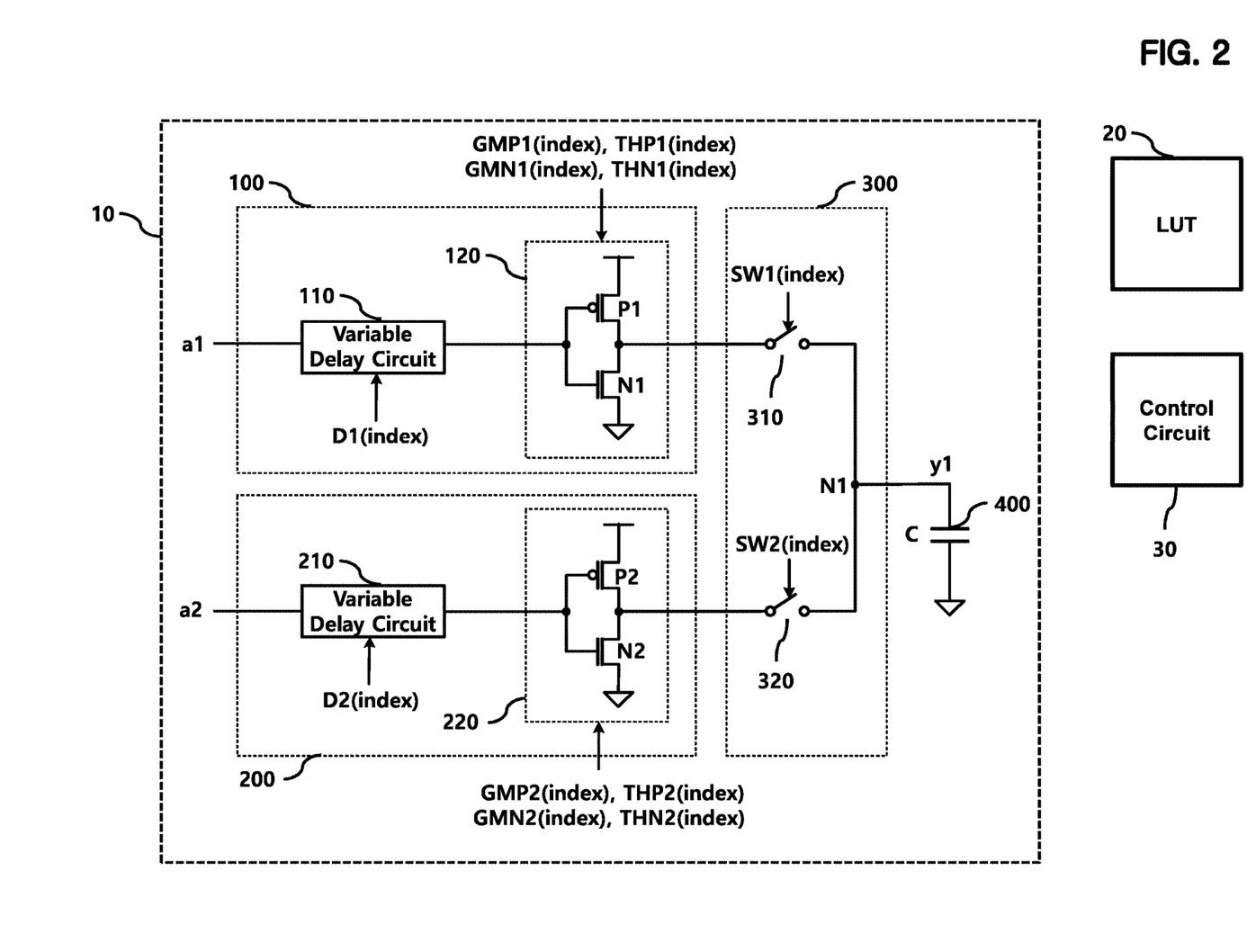
FIG. 2 shows a block diagram illustrating a simulation device according to an embodiment of the present disclosure.

FIG. 2 shows a block diagram illustrating a simulation device according to an embodiment of the present disclosure.

The simulation device performs a simulation using a circuit module which models the digital circuit 1 of FIG. 1.

In this embodiment, the circuit module includes a model circuit 10 and a look-up table (LUT) 20.

In this embodiment, the simulation device further includes a control circuit 30 for controlling the model circuit 10 and the LUT 20 to perform a simulation operation.

The control circuit 30 may provide one or more control signals or one or more operation parameters to the model circuit 10 by referring to the LUT 20 in accordance with the change of an input signal, e.g., a1 and/or a2, inputted to the circuit module during the simulation operation.

The LUT 20 stores a plurality of control signals and operation parameters for controlling an operation of the model circuit 10, which are determined to correspond to combinations of the input signals a1 and a2 and the output signal y1.

The model circuit 10 includes a plurality of delay inverter circuits 100 and 200 each delaying a corresponding input signal a1 or a2 and a switching circuit 300 connecting one of the delay inverter circuits 100 and 200 with an output node N1 where an output signal y1 is provided.

The model circuit 10 may further include a capacitor 400 connected to the output node N1.

The capacitance C of the capacitor 400 may be stored in the LUT 20.

The first delay inverter circuit 100 includes a first variable delay circuit 110 for delaying the first input signal a1 in accordance with a first delay control signal D1 and a first inverter circuit 120 for inverting an output of the first variable delay circuit 110.

The second delay inverter circuit 200 includes a second variable delay circuit 210 for delaying the second input signal a2 in accordance with a second delay control signal D2 and a second inverter circuit 220 for inverting an output of the second variable delay circuit 210.

A delay amount of the first variable delay circuit 110 is set by the first delay control signal D1 provided from the LUT 20, and a delay amount of the second variable delay circuit 210 is set by the second delay control signal D2 provided from the LUT 20.

At this time, the first and second delay control signals D1 and D2 may have values for directly designating the delay amounts of the first and second variable delay circuits 110 and 210, respectively.

Figure 3:
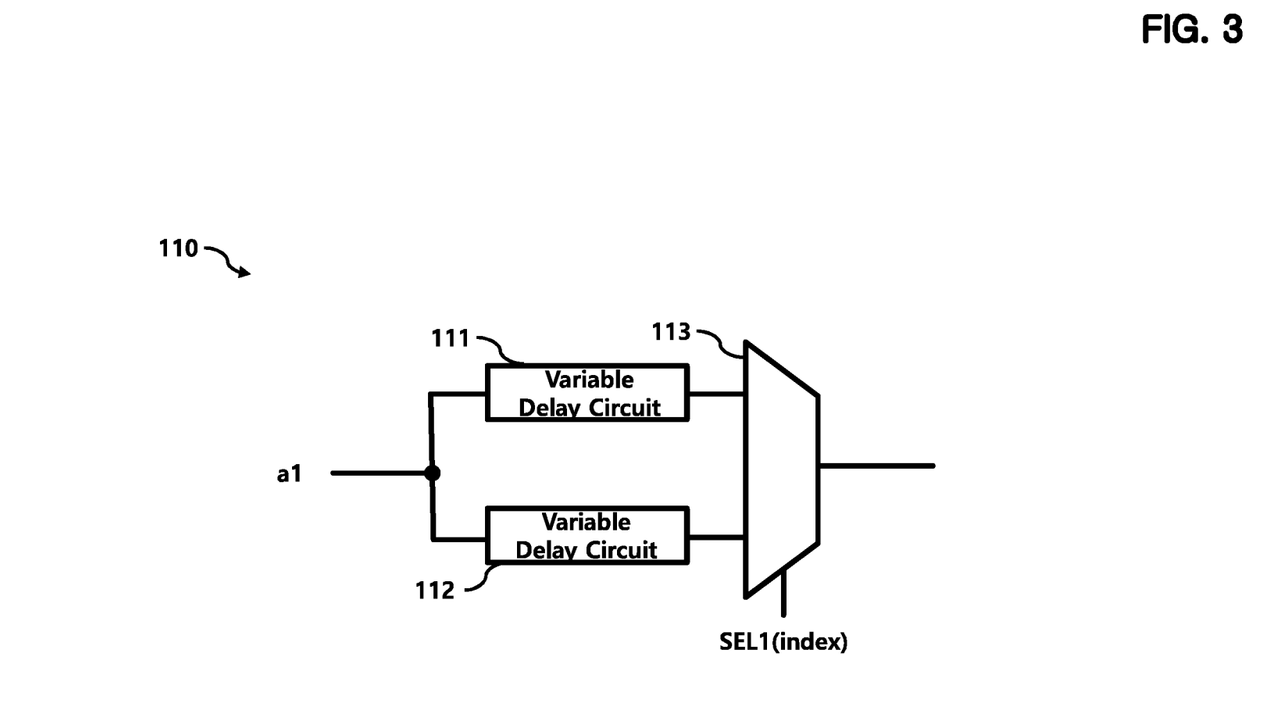
FIGS. 3 and 4 show circuit diagrams illustrating variable delay circuits according to embodiments of the present disclosure.
Figure 4:
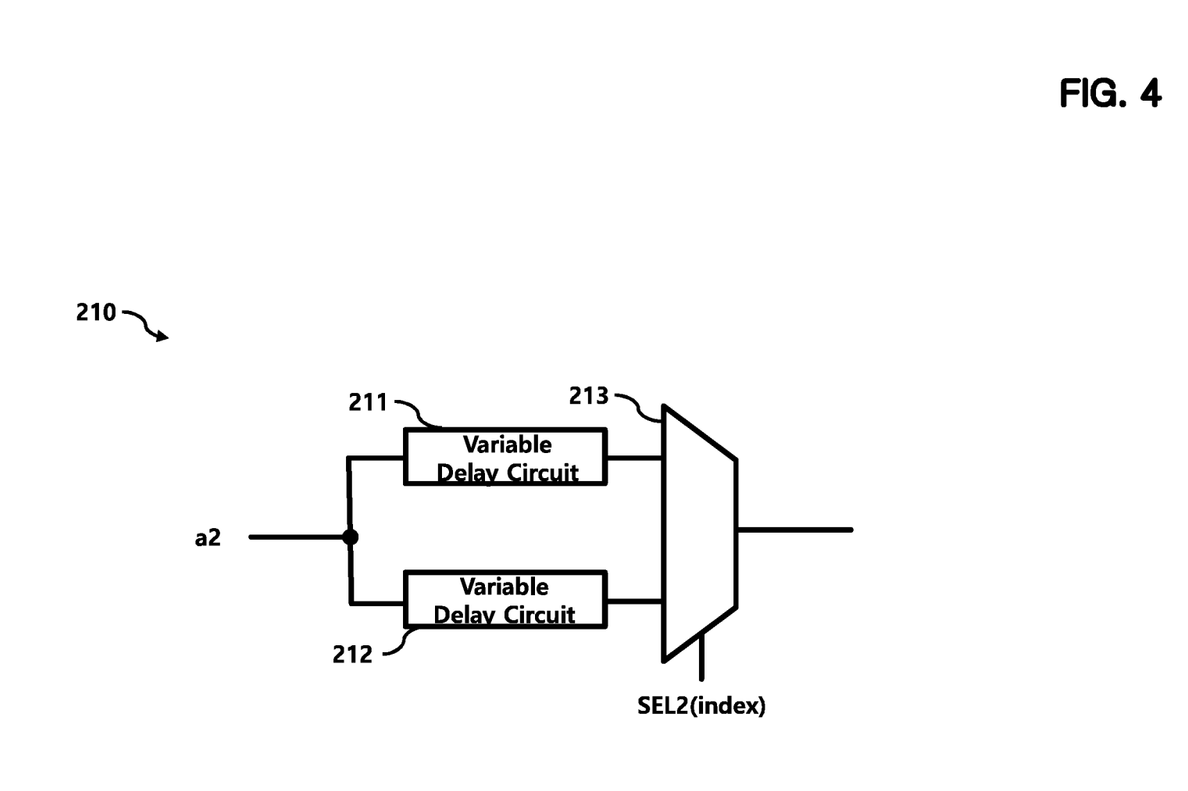

In another embodiment, the first variable delay circuit 110 has the configuration shown in FIG. 3, and the second variable delay circuit 210 has the configuration shown in FIG. 4.

At this time, the first and second variable delay circuits 110 and 210 have substantially the same configuration.

Referring to FIG. 3, the first variable delay circuit 110 includes a plurality of delay circuits 111 and 112 for delaying the first input signal a1 according to different delay amounts and a selection circuit 113 for selecting one of outputs of the plurality of delay circuits 111 and 112.

Although the two delay circuits 111 and 112 are shown in FIG. 3, the number of delay circuits included in the first variable delay circuit 110 can be set differently according to embodiments.

A selection signal SEL1 provided to the selection circuit 113 is stored in the LUT 20. This will be described in detail below.

In the present embodiment, the first inverter circuit 120 included in the first delay inverter circuit 100 includes a PMOS transistor P1 and an NMOS transistor N1 whose gates are connected in common to an input node and whose drains are connected in common to an output node. The input node of the first inverter circuit 120 is connected to the first variable delay circuit 110, and the output node of the first inverter circuit 120 is connected to the switching circuit 300.

In this embodiment, the LUT 20 stores operation parameters of the PMOS transistor P1 and the NMOS transistor N1.

The operation parameters provided to the first inverter circuit 120 set a rising or falling transition time of the output signal y1.

The operation parameters of the PMOS transistor P1 includes transconductance GMP1 and a threshold voltage THP1, and the operation parameters of the NMOS transistor N1 includes transconductance GMN1 and a threshold voltage THN1.

Referring to FIG. 4, the second variable delay circuit 210 includes a plurality of delay circuits 211 and 212 for delaying the second input signal a2 by different delay amounts and a selection circuit 213 for selecting one of outputs of the plurality of delay circuits 211 and 212.

Although the two delay circuits 211 and 212 are shown in FIG. 4, the number of delay circuits included in the second variable delay circuit 210 may vary according to embodiments.

A selection signal SEL2 provided to the selection circuit 213 is stored in the LUT 20. This will be described in detail below.

In the present embodiment, the second inverter circuit 220 included in the second delay inverter circuit 200 includes a PMOS transistor P2 and an NMOS transistor N2 whose gates are connected in common to an input node and whose drains are connected in common to an output node. The input node of the second inverter circuit 220 is connected to the second variable delay circuit 210, and the output node of the second inverter circuit 220 is connected to the switching circuit 300.

The operation parameters provided to the second inverter circuit 220 sets the rising or falling transition time of the output signal y1.

In this embodiment, the LUT 20 stores operation parameters of the PMOS transistor P2 and the NMOS transistor N2.

The operation parameters of the PMOS transistor P2 include transconductance GMP2 and a threshold voltage THP2, and the operation parameters of the NMOS transistor N2 include transconductance GMN2 and a threshold voltage THN2.

The number of delay inverter circuits included in the model circuit 10 corresponds to the number of input signals.

For example, if there are N (N is a natural number) input signals, N delay inverter circuits may be included in the model circuit 10.

The switching circuit 300 includes a first switch 310 for providing the output of the first delay inverter circuit 100 to the output node N1 in response to a first switch signal SW1 and a second switch 320 for providing the output of the second delay inverter circuit 200 to the output node N1 in response to a second switch signal SW2.

The number of switches included in the switching circuit 300 corresponds to the number of delay inverter circuits included in the model circuit 10.

For example, if there are N delay inverter circuits in the model circuit 10, N switches may be included in the switching circuit 300.

In this case, each of the switches provides the output of the corresponding delay inverter circuit to the output node N1 in response to the corresponding switch signal.

When there is one delay inverter circuit, the switching circuit 300 may include one switch, and thus the output of the delay inverter circuit may be directly connected to the output node N1 via the one switch.

The value of the output node N1 corresponds to the output signal y1.

FIGS. 5 to 8 shows tables illustrating the LUT 20 of FIG. 2 according to an embodiment of the present disclosure.

Hereinafter, a method for generating the LUT 20 is disclosed assuming that the digital circuit 1 is a NAND gate.

Figure 5:
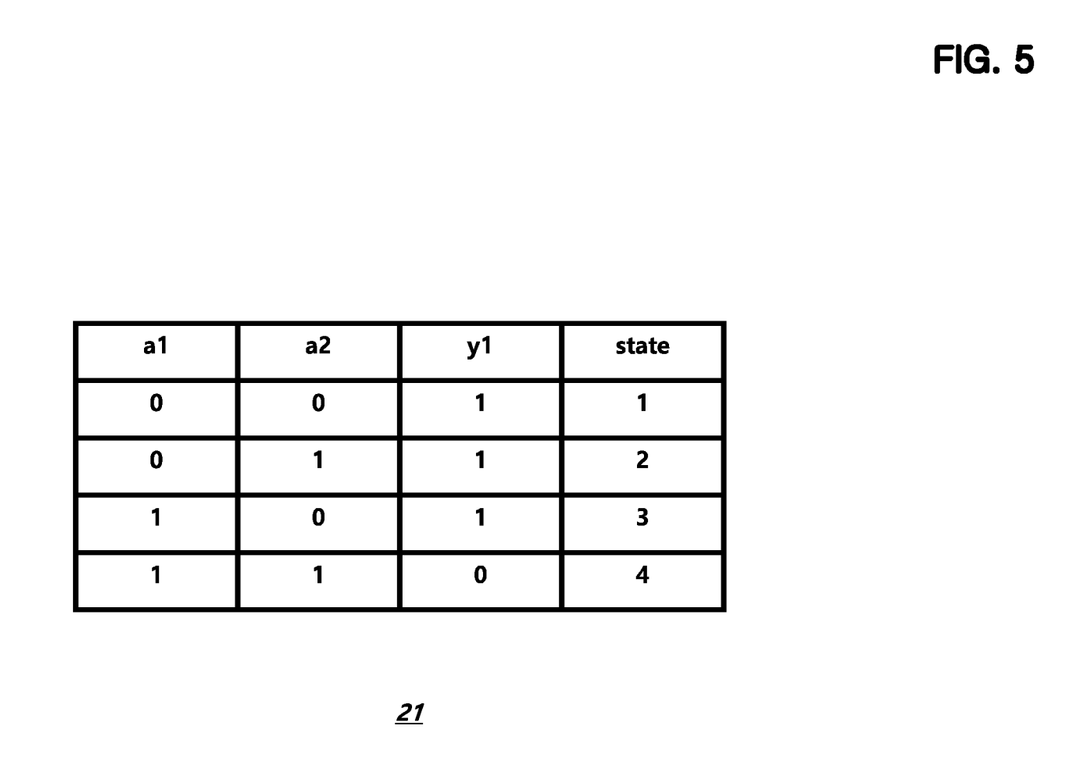
FIGS. 5 to 8 show tables illustrating a structure of a Look-Up Table (LUT) according to an embodiment of the present disclosure.

FIG. 5 shows a table for setting state variables corresponding to combinations of the input signals a1 and a2.

Hereinafter, the table shown in FIG. 5 may be referred to as a first table 21.

In the present embodiment, state 1 corresponds to a case where the input signals a1 and a2 are (0, 0), state 2 corresponds to a case where the input signals a1 and a2 are (0, 1), state 3 corresponds to a case where the input signals a1 and a2 are (1, 0), and state 4 corresponds to a case where the input signals a1 and a2 are (1, 1).

Thus, each of the states in the first table 21 corresponds to a corresponding combination of the input signals a1 and a2.

Figure 6:
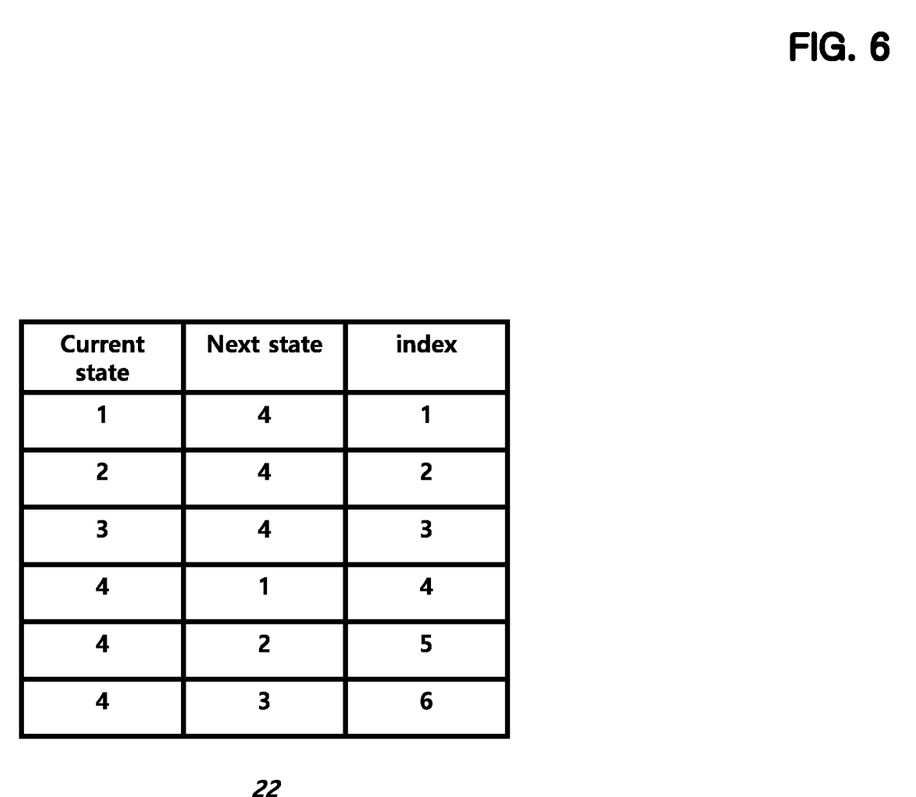

FIG. 6 shows a table for setting an index variable corresponding to the change of a state causing the change of the output signal y1.

Hereinafter, the table shown in FIG. 6 may be referred to as a second table 22.

In FIG. 5, a case where the output signal y1 changes from 1 to 0 corresponds to a case where the current state is one of 1, 2, and 3 and the next state is 4, and a case where the output signal y1 changes from 0 to 1 corresponds to a case where the current state is 4 and the next state is one of 1, 2, and 3.

In the second table 22 of FIG. 6, an index value is given for each of six combinations of the current state and the next state.

In the present embodiment, index 1 corresponds to a case where the current state is 1 and the next state is 4, index 2 corresponds to a case where the current state is 2 and the next state is 4, index 3 corresponds to a case where the current state is 3 and the next state is 4, index 4 corresponds to a case where the current state is 4 and the next state is 1, index 5 corresponds to a case where the current state is 4 and the next state is 2, and index 6 corresponds to a case where the current state is 4 and the next state is 3.

Figure 7:
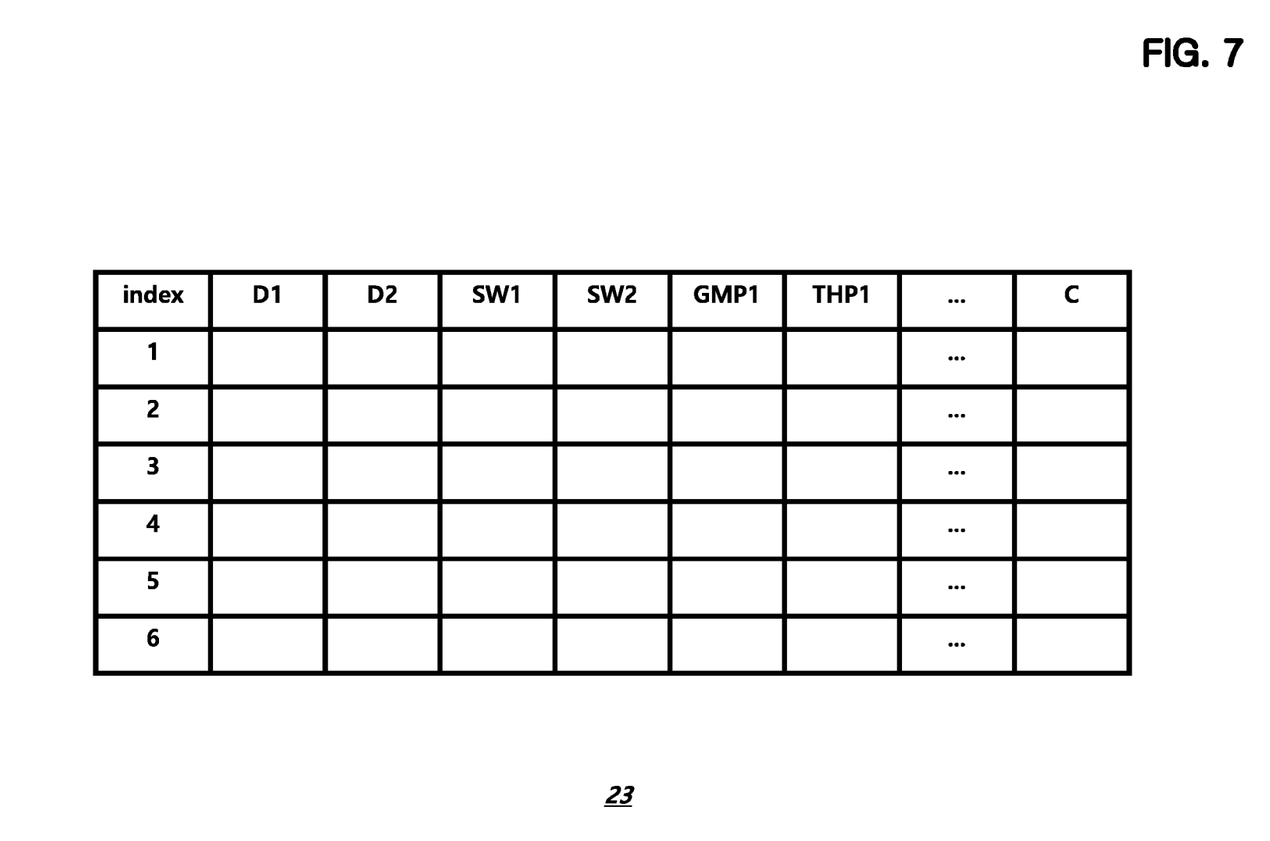
Figure 8:
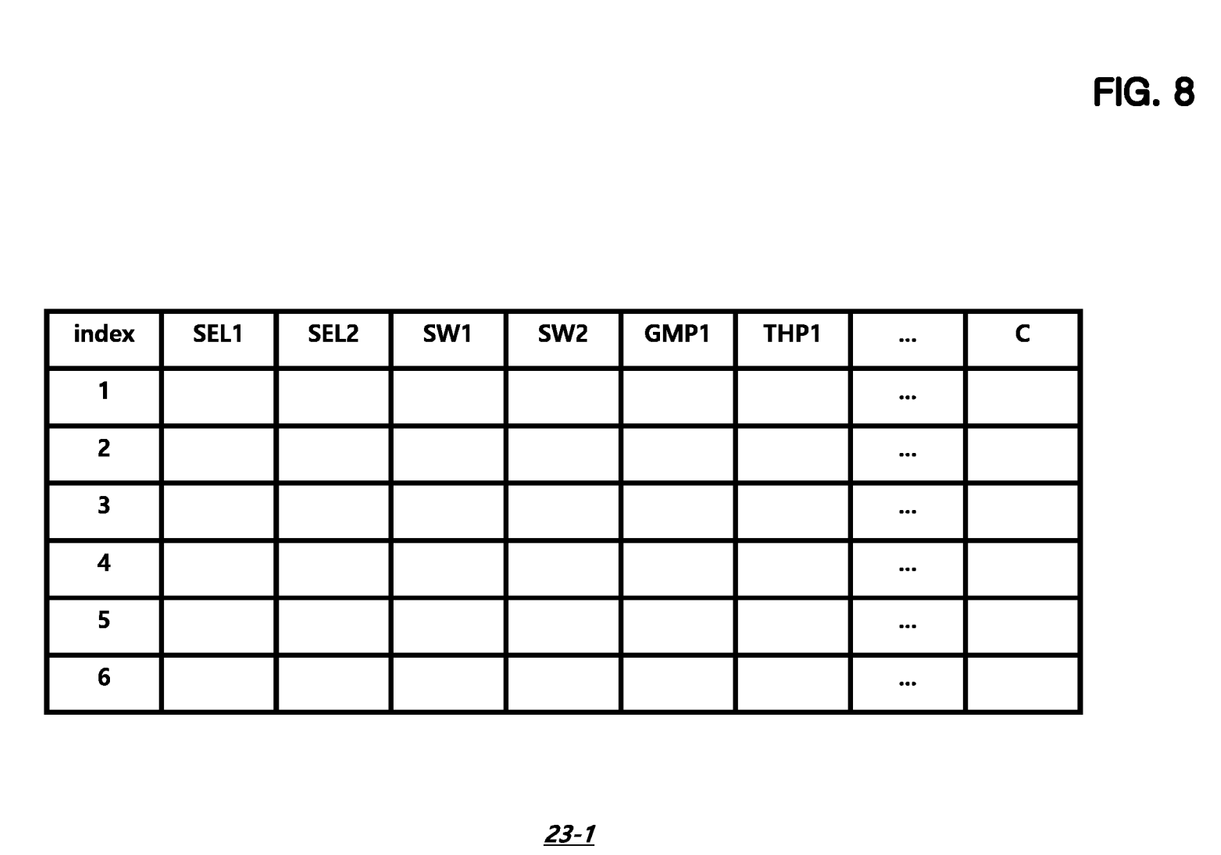

FIGS. 7 and 8 show tables for storing control signals and operation parameters provided to the model circuit 10 of FIG. 2 for each index in FIG. 6.

Hereinafter, the tables shown in FIGS. 7 and 8 may be referred to as third tables 23 and 23-1, respectively.

Each index in FIG. 6 corresponds to a case where the output signal y1 transitions as shown in FIG. 5.

Each index in FIG. 6 corresponds to a case where the output signal y1 transitions as shown in FIG. 5.

The third table 23-1 of FIG. 8 stores the selection signals SEL1 and SEL2, the first and second switch signals SW1 and SW2, and the operation parameters GMP1, THP1, GMP2, THP2, and C to be provided to the model circuit 10 at the time when the output signal y1 transitions. The third table 23-1 of FIG. 8 may further store the operation parameters GMN1, THN1, GMN2, and THN2.

Hereinafter, an operation of the control circuit 30 when the input signal changes will be described.

The control circuit 30 identifies that a case where the input signals a1 and a2 change from (0, 0) to (1, 1) corresponds to a case where the state variable changes from 1 to 4, and corresponds to the index 1 by referring to the first and second tables 21 and 22 respectively shown in FIGS. 5 and 6.

When the control circuit 30 identifies that the change of the input signals a1 and a2 corresponds to the index 1, the control circuit 30 provides the delay control signals or selection signals, switch signals, and operation parameters corresponding to the index 1 to the model circuit 10 with reference to the third table 23 or 23-1.

When the state variable changes from 1 to 4, the output signal y1 changes from 1 to 0, which corresponds to inverting the input signal a1. The input signal a1 changes from 0 to 1.

Accordingly, the first and second switch signals SW1 and SW2 corresponding to the index 1 in the third table 23 or 23-1 are set such that the first switch 310 is turned on and the second switch 320 is turned off.

In this embodiment, the LUT 20 may include the first table 21, the second table 22, and the third table 23 or 23-1 described above.

The structure of each table included in the LUT 20 may vary according to embodiments.

Figure 9:
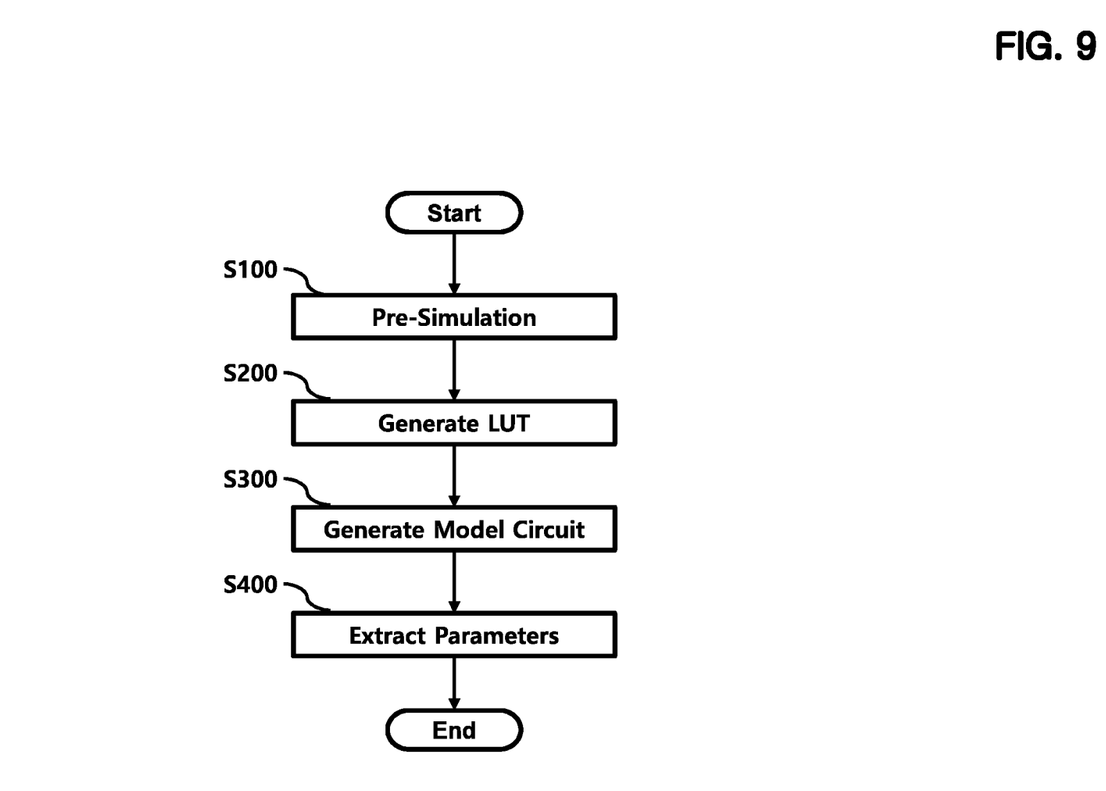
FIG. 9 shows a flow chart illustrating a method of generating a circuit module according to an embodiment of the present disclosure.

FIG. 9 shows a flow chart illustrating a method of generating a circuit module according to an embodiment of the present disclosure.

First, a pre-simulation is performed at S100.

In the pre-simulation process, a spice simulation for the digital circuit 1 is performed using a spice model corresponding to an actual manufacturing process.

At this time, logic values of the output signal y1 for all combinations of the input signals a1 and a2, a delay amount, and a transition time of the output signal y1 based on the change of the input signals a1 and a2 can be obtained from the result of the pre-simulation process.

Next, the LUT 20 is generated at S200.

For example, the first table 21 shown in FIG. 5 is generated by assigning a state value to each combination of the input signals a1 and a2, and the second table 22 shown in FIG. 6 is generated by assigning an index value to each combination of state changes.

Then, the third table 23 or 23-1 respectively shown in FIG. 7 or 8 is generated so that control signals and operation parameters corresponding to each index may be allocated.

The specific values of the control signals and operation parameters corresponding to each index of the third tables 23 and 23-1 are not determined yet.

Next, the model circuit 10 is generated at S300.

The model circuit 10 has a structure as shown in FIG. 2.

The model circuit 10 includes the first and second delay inverter circuits 100 and 200 corresponding to the number of input signals a1 and a2 as described above.

The model circuit 10 may further include the switching circuit 300 for selectively providing one of the outputs of the first and second delay inverter circuits 100 and 200 to the output node N1 and the capacitor 400 connected to the output node N1.

Next, the control signals and operation parameters for controlling the model circuit 10 are extracted at S400.

In this embodiment, the control signals include the delay control signals D1 and D2, the selection signals SEL1 and SEL2, and the switch signals SW1 and SW2.

In this embodiment, the operation parameters include the transconductances GMP1, GMN1, GMP2, and GMN2, the threshold voltages THP1, THN1, THP2, and THN2, and the capacitance C of the capacitor 400.

The logic values, delay time information, and transition time information obtained in the pre-simulation step S100 can be used to generate equations with variables corresponding to the above control signals and the operation parameters.

For example, the delay control signals D1 and D2 and the switch signals SW1 and SW2 can be determined based on the logic values and the delay amount of the output signal y1 for the input signals a1 and a2, the logic values and the delay amount of the output signal y1 being obtained from the pre-simulation process.

The operating parameters such as the transconductances GMP1, GMP2, GMN1, and GMN2, the threshold voltages THP1, THN1, THP2, and THN2, and the capacitance C of the capacitor 400 can be determined from the delay amount and the transition time.

The equations and the above determining method are easily known to the ordinarily skilled in the art, so that specific examples thereof are omitted.

The operation parameters may be determined by applying numerical methods so that an error occurring in the pre-simulation is minimized when the exact solution cannot be obtained from the equations.

These control signals and operation parameters are determined for each index, and the control circuit 30 can provide the control signals and operation parameters stored in the third table 23 or 23-1 to the model circuit 10 with reference to the corresponding index.

Figure 10:
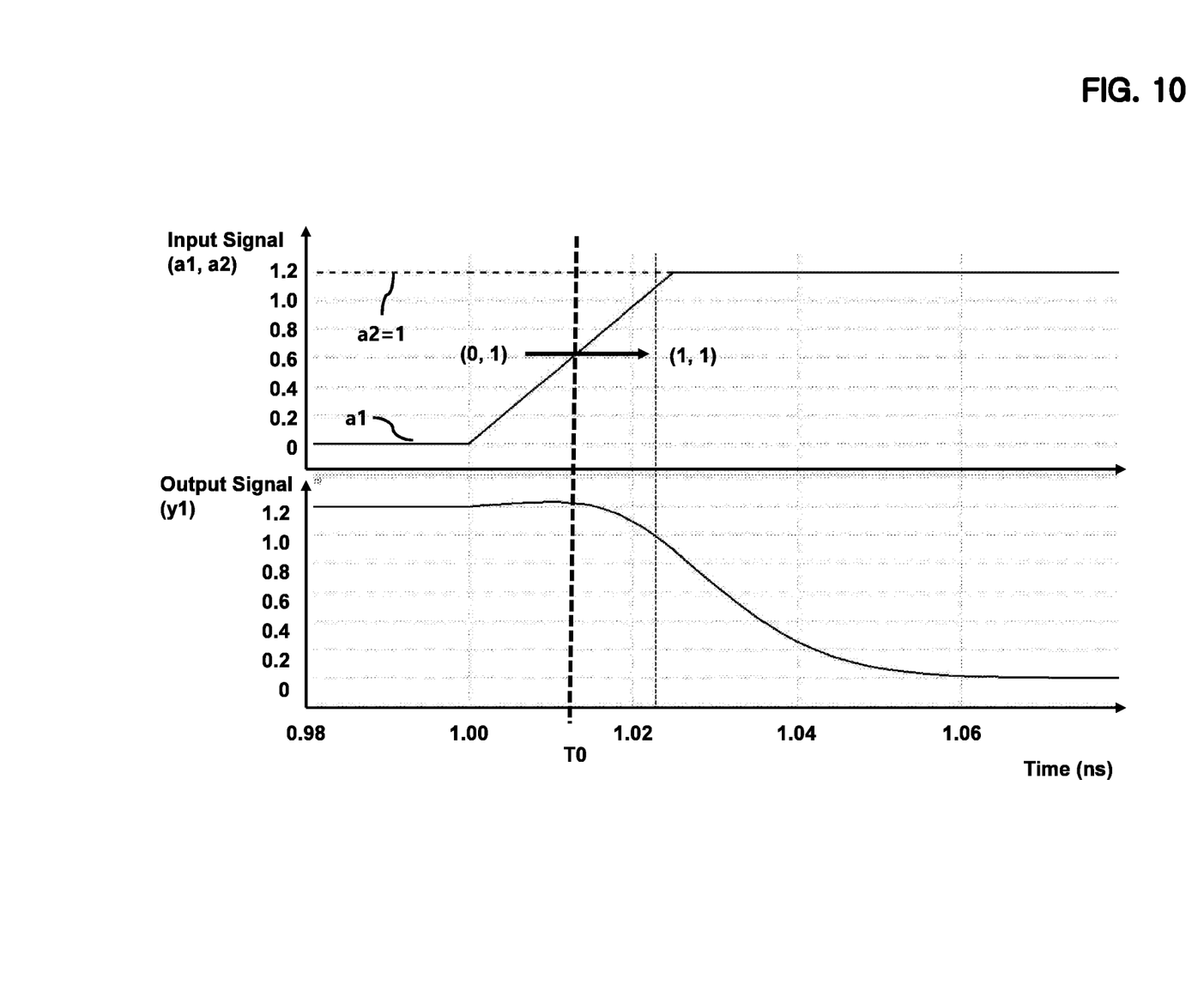
FIG. 10 shows an example of simulation according to an embodiment of the present disclosure.

FIG. 10 shows an example of simulation where the output signal y1 transitions according to the change of the input signals a1 and a2.

In FIG. 10, the input signals a1 and a2 change from (0, 1) to (1, 1).

When the input signals a1 and a2 change from (0, 1) to (1, 1), the control circuit 30 refers to the first table 21 shown in FIG. 5 and identifies that the change of the input signals a1 and a2 corresponds to the state change from 2 to 4. The control circuit 30 refers to the second table 22 and identifies that the state change from 2 to 4 corresponds to the index 2.

After that, the control circuit 30 outputs control signals and operation parameters corresponding to the index 2 to the model circuit 10 with reference to the third table 23 or 23-1, such that previous control signals and operation parameters for the model circuit 10 are updated with the control signals and operation parameters corresponding to the index 2.

When the input signals a1 and a2 change from (0, 1) to (1, 1), the model circuit 10 may operate according to the updated control signals and operation parameters, and may provide a waveform of the output signal y1 shown in FIG. 10. Therefore, when the output signal y1 changes from 1 to 0, and the modeling for a delay amount of the output signal y1 is accurately performed based on the updated control signals and operation parameters.

Figure 11:
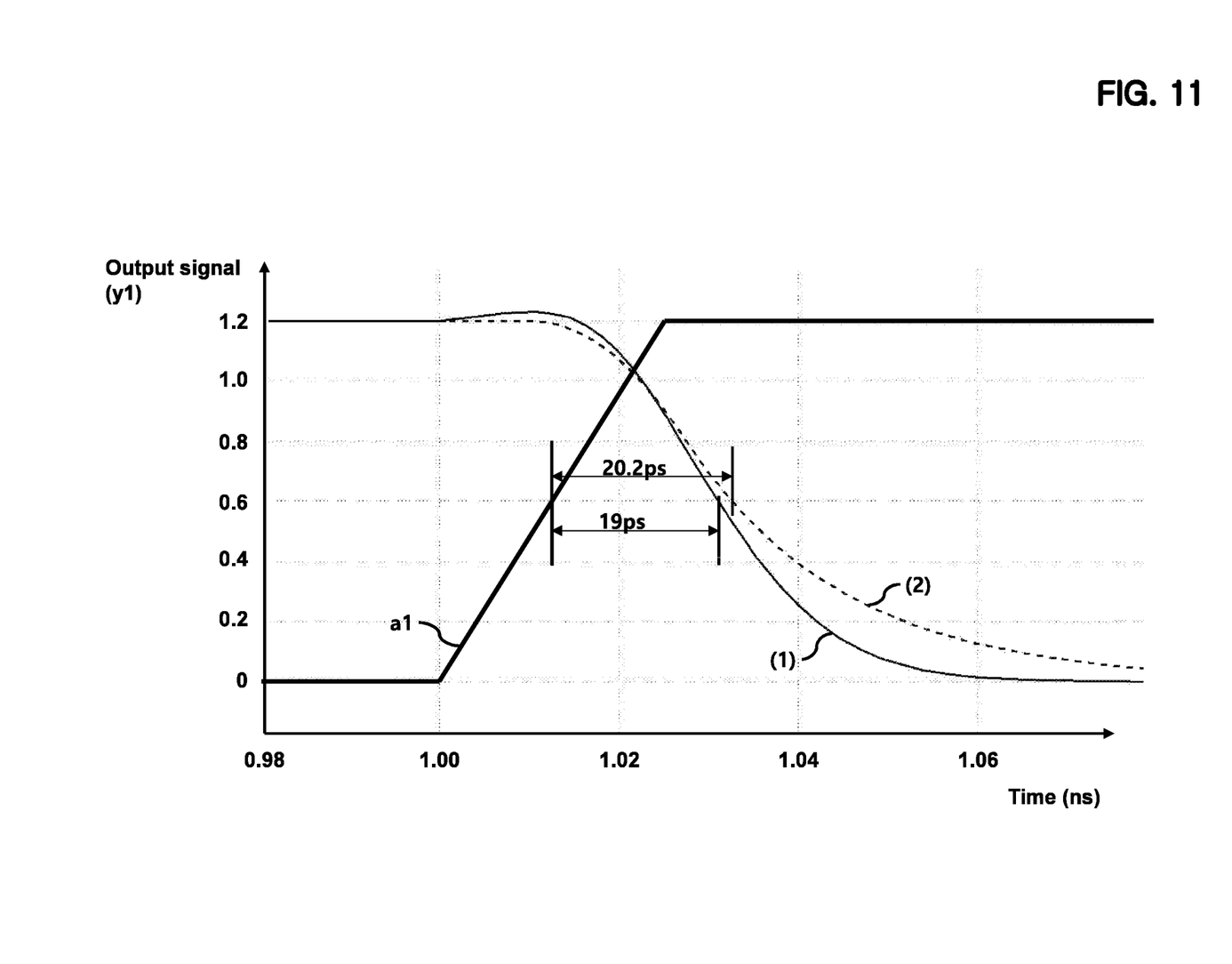
FIG. 11 shows a graph illustrating an operation of a simulation device according to an embodiment of the present disclosure.

FIG. 11 shows a graph illustrating an operation of a simulation device according to an embodiment of the present disclosure.

In FIG. 11, (1) indicates a result of the pre-spice simulation, and (2) indicates a simulation result using the model circuit 10 and the LUT 20 according to the present embodiment.

When considering a time period from a 50% rising point of the input signal a1 to a 50% falling point of the output signal y1, the time period in case of (1) is 19 ps and the time period in case of (2) is 20.2 ps.

In the present disclosure, when a digital circuit is very large, the entire digital circuit is divided into a plurality of sub-digital circuits, and a circuit module is generated for each of the sub-digital circuits. A simulation is sequentially or parallelly performed on all the circuit modules for the sub-digital circuits, so that the simulation for the entire digital circuit can be performed.

In the conventional case, it takes a long time to simulate the entire digital circuit.

However, a simulation time for the entire digital circuit can be greatly reduced by applying the simulation technology of the present disclosure to each sub-digital circuit and combining the simulation results of the sub-digital circuits.

For example, if the present disclosure is applied to a digital circuit including about 1000 inverters, a time reduction of about 1000 times can be expected as compared with the conventional technique of performing the spice simulation on the entire digital circuit.

Accordingly, when the present disclosure is applied, the simulation time may be greatly reduced while achieving a simulation result similar to that of the spice simulation.

Figure 12:
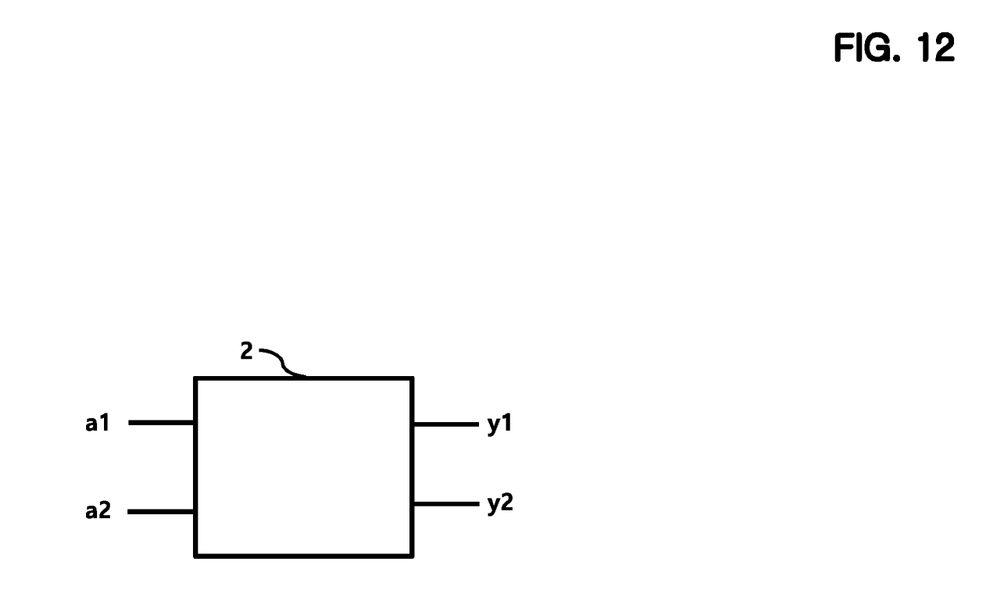
FIG. 12 shows a block diagram illustrating a digital circuit having a plurality of output signals according to an embodiment of the present disclosure.

FIG. 12 shows a digital circuit 2 having two output signals according to an embodiment of the present disclosure.

Figure 13:
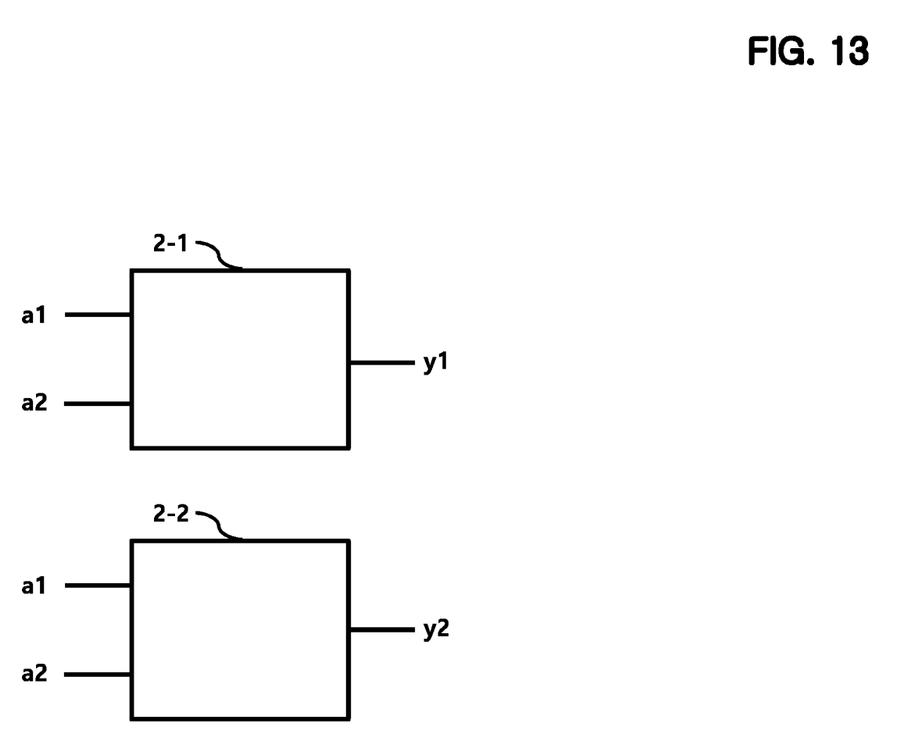
FIG. 13 shows a block diagram illustrating an equivalent digital circuit of the digital circuit shown in FIG. 12 according to an embodiment of the present disclosure.

In order to apply the modelling technology according to the present disclosure, the digital circuit of FIG. 12 may include a first digital circuit 2-1 for generating a first output signal y1 based on two input signals a1 and a2 and a second digital circuit 2-2 for generating a second output signal y2 based on the input signals a1 and a2, as shown in FIG. 13.

The model circuit 10 and the LUT 20 can be generated for each of the first and second digital circuits 2-1 and 2-2 as described above with reference to FIG. 2-8.

By performing simulations in parallel on the first and second digital circuits 2-1 and 2-2, a simulation result for the digital circuit 2 in FIG. 12 can be obtained.

A model circuit for a digital circuit having M input signals and N output signals may be easily derived from the above disclosure, where M and N are natural numbers.

The above described model circuit 10 may be implemented as a software module and stored in a semiconductor chip or a storage medium readable by a computer.

The LUT 20 and the control circuit 30 may be implemented as a hardware chip, but may also be implemented as a software module.

If each of the LUT 20 and the control circuit 30 is implemented as a software module, the software modules for the LUT 20 and the control circuit 30 may be stored in a storage medium together with or separately from the software module for the model circuit 10.

Although various embodiments have been described for illustrative purposes, it will be apparent to those skilled in the art that various changes and modifications may be made to the described embodiments without departing from the spirit and scope of the disclosure as defined by the following claims.

What is claimed is:
1. A circuit module comprising:
a model circuit configured to generate an output signal based on one or more input signals, and correspond to a digital circuit; and
a look-up table (LUT) storing one or more control signals and one or more operation parameters that are to be used to implement the model circuit, the one or more control signals and the one or more operation parameters corresponding to an index determined by a combination of the one or more input signals and the output signal,
wherein the model circuit comprises:
one or more delay inverter circuits each configured to delay and invert a corresponding one of the one or more input signals by adjusting a delay amount or an output transition property of each of the one or more delay inverter circuits; and
one or more switching circuits each configured to connect an output of a corresponding one of the one or more delay inverter circuits to an output node,
wherein the delay amount of each of the one or more delay inverter circuits and switching operations of the one or more switching circuits are controlled by the one or more control signals stored in the LUT, and the output transition property is controlled by the one or more operation parameters stored in the LUT.

2. The circuit module of claim 1, wherein the index is determined by a combination of values of the one or more input signals before a value of the output signal transitions and values of the one or more input signals after the value of the output signal transitions.

3. The circuit module of claim 2, wherein the LUT stores a first table storing a state variable having a value corresponding to a combination of values of the one or more input signals, or a second table storing an index variable having a value corresponding to a combination of a value of the state variable before the value of the output signal transitions and a value of the state variable after the value of the output signal transitions, or both of the first and second tables.

4. The circuit module of claim 1, wherein the model circuit further comprises a capacitor connected to the output node, and capacitance of the capacitor is controlled by the one or more operation parameters.

5. The circuit module of claim 1, wherein a number of the one or more delay inverter circuits corresponds to a number of the one or more input signals, and each of the one or more switching circuits is configured to connect a corresponding one of the one or more delay inverter circuits to the output node.

6. The circuit module of claim 1, wherein each of the one or more delay inverter circuits comprises:
a variable delay circuit configured to variably delay a corresponding input signal among the one or more input signals according to the one or more control signals; and
an inverter circuit configured to invert an output of the variable delay circuit,
wherein a transition property of the inverter circuit is controlled by the one or more operation parameters.

7. The circuit module of claim 6, wherein the variable delay circuit comprises:
a plurality of delay circuits each configured to delay the corresponding input signal by a predetermined time; and
a selection circuit configured to select one of outputs of the plurality of delay circuits according to the one or more control signals.

8. The circuit module of claim 6, wherein the inverter circuit comprises a PMOS transistor and an NMOS transistor having gates connected to each other and drains connected to each other, and wherein the one or more operation parameters include transconductances or threshold voltages of the PMOS transistor and the NMOS transistor.

9. The circuit module of claim 1, wherein the model circuit is implemented as a software module stored in a semiconductor chip or a storage medium readable by a computer.

10. A simulation device comprising:
a model circuit configured to generate an output signal based on one or more input signals, and correspond to a digital circuit;
a look-up table (LUT) storing one or more control signals and one or more operation parameters that are to be used to implement the model circuit, the one or more control signals and the one or more operation parameters corresponding to an index determined by a combination of the one or more input signals and the output signal; and
a control circuit configured to simulate the digital circuit by controlling the model circuit and the LUT,
wherein the model circuit comprises:
one or more delay inverter circuits each configured to delay and invert a corresponding one of the one or more input signals by adjusting a delay amount or an output transition property of each of the one or more delay inverter circuits; and
one or more switching circuits each configured to connect an output of a corresponding one of the one or more delay inverter circuits to an output node,
wherein the delay amount of each of the one or more delay inverter circuits and switching operations of the one or more switching circuits are controlled by the one or more control signals stored in the LUT, and the output transition property is controlled by the one or more operation parameters stored in the LUT.

11. The simulation device of claim 10, wherein the index is determined by a combination of values of the one or more input signals before a value of the output signal transitions and values of the one or more input signals after the value of the output signal transitions.

12. The simulation device of claim 11, wherein the LUT stores a first table storing a state variable having a value corresponding to a combination of values of the one or more input signals, or a second table storing an index variable having a value corresponding to a combination of a value of the state variable before the value of the output signal transitions and a value of the state variable after the value of the output signal transitions, or both of the first and second tables.

13. The simulation device of claim 10, wherein the model circuit further comprises a capacitor connected to the output node and capacitance of the capacitor is controlled by the one or more operation parameters.

14. The simulation device of claim 10, wherein a number of the one or more delay inverter circuits corresponds to a number of the one or more input signals, and each of the one or more switching circuits is configured to connect a corresponding one of the one or more delay inverter circuits to the output node.

15. The simulation device of claim 10, wherein each of the one or more delay inverter circuits comprises:
a variable delay circuit configured to variably delay a corresponding input signal among the one or more input signals according to the one or more control signals; and
an inverter circuit configured to invert the variable delay circuit,
wherein a transition property of the inverter circuit is controlled by the one or more operation parameters.

16. The simulation device of claim 15, wherein the variable delay circuit comprises:
a plurality of delay circuits each configured to delay the corresponding input signal by a predetermined time; and
a selection circuit configured to select one of outputs of the plurality of delay circuits according to the one or more control signals.

17. The simulation device of claim 15, wherein the inverter circuit comprises a PMOS transistor and an NMOS transistor having gates connected to each other and drains connected to each other, and wherein the one or more operation parameters include transconductance or threshold voltages of the PMOS transistor and the NMOS transistor.

18. The simulation device of claim 10, wherein the model circuit is implemented as a software module stored in a semiconductor chip or a storage medium readable by a computer.

* * * * *